United States Patent [19]

Kennard et al.

[11] Patent Number: 4,855,692

[45] Date of Patent: Aug. 8, 1989

[54] METHOD OF QUADRATURE-PHASE AMPLITUDE MODULATION

[75] Inventors: Paul A. Kennard, Nepean; Joseph L. Middleton, Ottawa; Kuang-Tsan Wu; John D. McNicol, both of Nepean, all of Canada

[73] Assignee: Northern Telecom Limited, Montreal, Canada

[21] Appl. No.: 208,701

[22] Filed: Jun. 20, 1988

[51] Int. Cl.$^4$ .................. H03C 5/00; H04L 27/00
[52] U.S. Cl. .............................. 332/17; 332/18; 375/39
[58] Field of Search .............. 332/9 R, 16 R, 17, 18, 332/31 R, 37 R; 375/39, 67

[56] References Cited

U.S. PATENT DOCUMENTS

| | | | |
|---|---|---|---|
| 4,675,619 | 6/1987 | Uchibori et al. | 332/31 R |
| 4,716,385 | 12/1987 | Noda et al. | 332/9 R |
| 4,750,191 | 6/1988 | Yoshida | 332/9 R X |

OTHER PUBLICATIONS

"A Stepped Square 256QAM for Digital Radio System", by T. Ryu et al., ICC'86, Jun. 1986, pp. 1477-1481.
"Digital Amplitude-Phase Keying with M-ary Alphabets" by Melvil C. Thomas et al, 1972, International Telemetry Conference, Los Angeles, California, IEEE Transactions on Communications, Feb. 1974, pp. 168-179.
"Odd-Bit Quadrature Amplitude-Shift Keying", Joel G. Smith, 1974 Telemetering Conference, Los Angeles, California, Oct. 15-17, published in IEEE Transactions on Communications, Mar. 1973.
"Duplex Transmission at 4800 and 9600 Bits/s on the General Switched Telephone Network and the Use of Channel Coding with a Partitioned Signal Constellation", by John D. Brownlie et al., Proceedings of the 1984 Zurich Seminar on Digital Communications, Mar. 6-8, 1984, pp. 113-120.

Primary Examiner—Siegfried H. Grimm
Attorney, Agent, or Firm—R. John Haley

[57] ABSTRACT

A square array of signal points forming a QAM signal point constellation is modified by relocating signal points from corners of the square to positions extrapolated from the square array and at reduced distances from the origin, corresponding to reduced peak amplitude levels. The relocation is effected in a manner to maintain, at least for a majority of the relocated points, a Hamming distance of one. To this end for a constellation of $2^{2n}$ points, with $n=4$ or more and points with I and Q amplitudes 1, 3, 5, ... $2^n-1$ units in the square array, a plurality of points in each quadrant are relocated to positions, relative to positions which they would have in the square array, rotated through an angle of 180° about predetermined reference points having I and Q amplitude co-ordinates of $(2^n, 2^{n-1})$ and $(2^{n-1}, 2^n)$. Specific examples are described for 256 QAM ($n=4$) and 1024 QAM ($n=5$).

19 Claims, 6 Drawing Sheets

METHOD OF QUADRATURE-PHASE AMPLITUDE MODULATION

This invention relates to a method of quadrature-phase amplitude modulation, more conveniently referred to as QAM.

In QAM, two carrier signals in phase quadrature are amplitude modulated by modulating signals, and are subsequently combined for example for transmission in a microwave radio transmission system. Each transmitted symbol can thus have any one of a relatively large number of phase and amplitude states, which are generally illustrated as signal points in a signal point constellation in a phase plane diagram. Various signal point constellations, of triangular, rectangular, circular, and hexagonal forms and for various numbers of signal points, are described for example in "Digital Amplitude-Phase Keying with M-ary Alphabets" by C. Melvil Thomas et al., presented at the 1972 International Telemetry Conference, Los Angeles, Calif.

For digital transmission of binary data signals, it is convenient for the number of signal points in the signal point constellation to be an integral power of 2. Thus for example 64-QAM transmission systems, in which there are 64 signal points in the constellation so that each transmitted symbol can represent 6 bits ($2^6=64$), are well known. With increasing demands for data transmission, and increasingly more sophisticated techniques, it is desirable to provide higher numbers of signal points in the constellation, for example 256 signal points for 256-QAM in which each transmitted symbol represents 8 bits ($2^8=256$).

It is well known that the signal points should be spaced in the phase plane as far apart as possible to provide the greatest possible signal-to-noise (S/N) ratio, and that the signal points should have the smallest possible amplitudes to minimize the peak power of the transmitted signal. It is also desirable to simplify as far as possible the coding and decoding circuitry required for converting between the signal points in the phase plane and the digital signals which they represent. Particularly in view of this last matter, rectangular signal point constellations, in which the signal points are arranged on a square matrix or grid, have been preferred. Where the number of signal points is an even power of 2, the signal point constellation becomes a square array, for example of 16 by 16 signal points for 256-QAM.

A problem with a square array of 256 signal points is that the points at the corners of the square have relatively large amplitudes, and hence result in a high peak power and a high peak-to-average power ratio for the transmitted signal. In order to reduce this problem, in "Duplex Transmission at 4800 and 9600 Bit/s on the General Switched Telephone Network and the Use of Channel Coding with a Partitioned Signal Constellation" by John D. Brownlie et al., Proceedings of the 1984 International Zurich Seminar on Digital Communications, Mar. 6-8, 1984, pages 113-120 there is described a 256-QAM signal point constellation consisting of a modified 16 by 16 point square in which six signal points are shifted from each corner to lower-amplitude positions closer to the axes. The same rearrangement of points is described in "A Stepped Square 256QAM for Digital Radio System" by T. Ryu et al., ICC '86, June 1986, pages 46.6.1 to 46.6.5, and the rearrangement is described in further detail in Uchibori et al. U.S. Pat. No. 4,675,619 dated June 23, 1987 and entitled "Multiple Quadrature-Phase Amplitude Modulating System Capable of Reducing a Peak Amplitude".

In such a modified, or stepped, square QAM signal point constellation the peak amplitude is reduced, relative to a square constellation, by relocating signal points at the corners of the square so that the signal points are arranged in an extrapolated square matrix within a generally circular pattern. While this relocation of signal points results in reduced peak amplitudes, it introduces a further disadvantage, discussed below, which has not been addressed by the prior art.

More specifically, Gray coding of digital input signals is generally used so that the digital signal represented by each signal point in the constellation differs from the digital signal represented by any immediately adjacent signal point in only one bit position. Thus a transmitted symbol or signal point which is corrupted and consequently interpreted mistakenly as an adjacent signal point contains only a single bit error. Such a single bit error can be relatively easily detected and corrected using known coding schemes; for example, a (511,493) BCH code can be used which can correct up to two bits in error in a block of 511 bits.

However, relocating signal points in the manner discussed above, and as described in detail in U.S. Pat. No. 4,675,619, results in 32 of the 256 signal points representing digital signals having 3 bits different from the signal represented by an immediately adjacent signal point; in other words they have a Hamming distance of 3 rather than the preferred Hamming distance of 1. Corruption and consequent misinterpretation of such a signal point results in 3 bits being in error, and this is not correctable using the (511,493) BCH code discussed above.

Furthermore, the relocation of signal points as described in U.S. Pat. No. 4,675,619 has the disadvantage that it is incompatible with the method described and claimed in J. McNicol et al. Canadian patent application No. 543,871 filed Aug. 6, 1987 and entitled "Method of Communicating Stuffing Indications in a Multi-Level Communications System". As described therein, stuffing indication bits are transmitted in a QAM transmission system only once in each frame using, for the two possible states of a stuffing indication bit, respective sets of signal points in the constellation, the minimum separation between any two signal points in the different sets being much greater than the signal point separation of the system, whereby the reliability with which stuffing indications are communicated is greatly enhanced. The relocation of signal points as described in the piror art disrupts this minimum separation, and hence removes the enhanced reliability of communicating stuffing indications.

An object of this invention, therefore, is to provide an improved method in which the above disadvantages are reduced or avoided.

According to one aspect of this invention there is provided a method of quadrature-phase amplitude modulation comprising the step of amplitude modulating two carrier signal components I and Q in phase quadrature in accordance with signal points in a signal point constellation, the signal point constellation comprising $2^{2n}$ signal points, where n is an integer equal to or greater than 4, arranged in a modified square array with substantially $2^{2n-2}$ points in each of four quadrants defined by I and Q axes intersecting at an origin of a phase-plane diagram, the signal points in each quadrant of the square array having I and Q component amplitudes of 1, 3, 5, ... $2^{2n}-1$ units, the square array being modified by relocating a plurality of points in each quadrant from positions adjacent to a corner of the square to positions extrapolated from the square array and having reduced distances from the origin, wherein in each quadrant each of a majority of the points so relocated is located in a position, relative to the position which it would have in the square array, rotated through an angle of 180° about one of two predetermined points, said two predetermined points having I and Q amplitude co-ordinates of substantially $(2^n, 2^{n-1})$ and $(2^{n-1}, 2^n)$. It is to be understood that said two predetermined points are reference points only, and not signal points.

The method of the invention largely or entirely preserves Gray coding of the signal points, so that the said majority of the signal points located in positions as recited above all have a Hamming distance of 1 from adjacent signal points. In addition, the relocation of the signal points in accordance with the method of the invention enables the method of the copending patent application by J. McNicol et al. referred to above to be applied to the modified signal point constellation. At the same time, the method of the invention provides a reduction in amplitude, i.e. greatest distance of signal points from the origin, which is commensurate with that of the prior art.

In some embodiments of the invention described below, all of the relocated signal points are located in positions rotated through an angle of 180° about said predetermined points, and in other embodiments described below in each quadrant all but one of the relocated signal points are located in such positions.

For 256 QAM, n=4 and preferably in each quadrant 5 signal points are relocated in this manner, three being located in positions rotated through 180° about one of the predetermined points and two being located in positions rotated through 180° about the other of the predetermined points. The predetermined points in this case have I and Q amplitude co-ordinates of (16,8) and (8,16). A sixth point in each quadrant may be located in a lower amplitude position (closer to the origin), but its Hamming distance is thereby increased from 1 to 3.

For 1024 QAM, n=5 and preferably in each quadrant 19 signal points are relocated. They can all be relocated in the manner recited above, or alternatively 18 of them can be relocated in this manner and the nineteenth located in a position having a separation of at least $(8)^{\frac{1}{2}}$ units from the nearest adjacent signal point in the same quadrant. The latter case provides a lower peak amplitude, or greatest distance from the origin, than the former, but does not preserve true Gray coding for the nineteenth relocated point in each quadrant. However, the increased separation for this relocated point, from an adjacent point with respect to which it has a Hamming distance increased to 3, reduces considerably the risk of errors for this point.

The signal points in the four quadrants may be relocated so that the signal point constellation is symmetric about the I and Q axes, or so that the signal point constellation is rotationally invariant for phase changes of 90°.

According to another aspect this invention provides a method of quadrature-phase amplitude modulation comprising the step of amplitude modulating two carrier signal components I and Q in phase quadrature in accordance with signal points in a signal point constellation, the signal point constellation comprising $2^{2n}$ signal points, where n is an integer equal to or greater than 4, arranged in a modified square array with substantially $2^{2n-2}$ points in each of four quadrants defined by I and Q axes intersecting at an origin of a phase-plane diagram, the square array being modified by relocating a plurality of points in each quadrant from positions adjacent to a corner of the square to positions extrapolated from the square array and having reduced distances from the origin, wherein each of a majority of the points so relocated is relocated, about an axis parallel to said one of the axes and substantially bisecting the points in the quadrant, to a position at substantially the same distance from said axis.

The invention will be further understood from the following description with reference to the accompanying drawings, in which.

Figure 1:
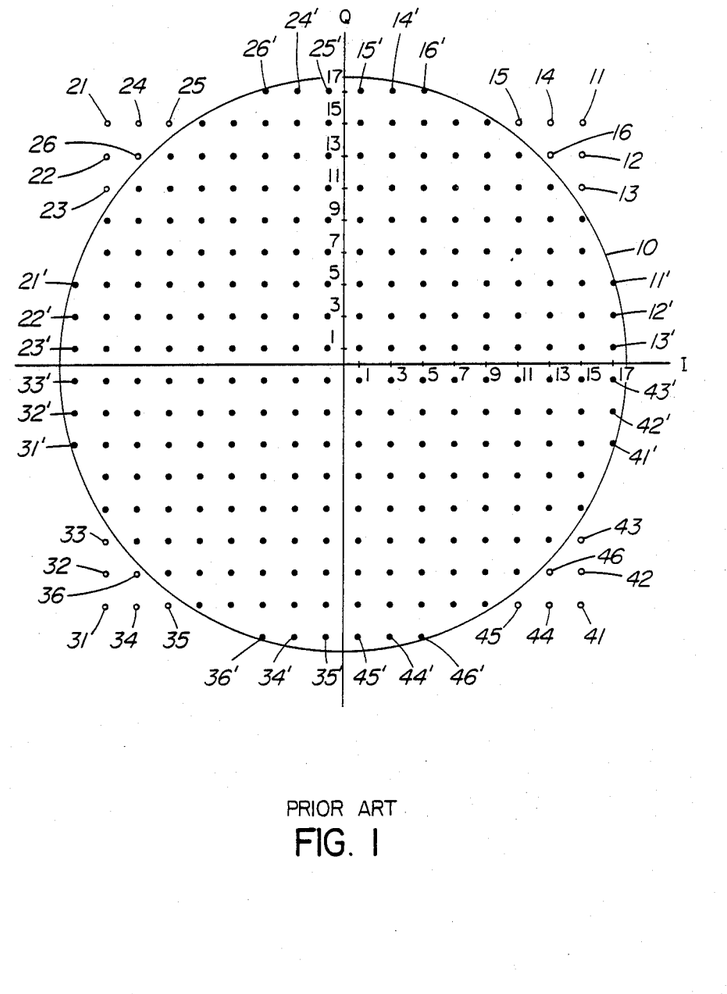
FIG. 1 illustrates a known 256-QAM signal point constellation.

Referring to FIG. 1, a 256-QAM signal point constellation as known from U.S. Pat. No. 4,675,619 is illustrated. The signal points are represented in a phase plane diagram showing the relative amplitudes of phase-quadrature carrier signal components I and Q for each point. The 256 points are arranged in a modified or stepped square matrix, the modification comprising relocating the outermost (greatest amplitude) six points in each quadrant in lower amplitude positions closer to the I and Q axes, whereby the 256 points are arranged in a rectangular array within a generally circular boundary, as represented by a circle 10. I and Q component amplitudes are shown for the positive I and Q axes, the points having I and Q amplitudes of 1, 3, 5, ... 17 units.

Thus in the first quadrant the outermost signal points 11 to 16 of the square are relocated to lower amplitude points 11' to 16' respectively; similarly in the second, third, and fourth quadrants the points 21 to 26, 31 to 36, and 41 to 46 are relocated to points 21' to 26', 31' to 36', and 41' to 46' respectively.

As the minimum separation of adjacent signal points is 2 units, the point 16 has a distance from the origin (intersection of the I and Q axes) of $(338)^{\frac{1}{2}}$ units; it is relocated to the point 16' which has a smaller distance from the origin of $(314)^{\frac{1}{2}}$ units. There is a similar or greater reduction in distance to the origin (and hence amplitude) for each of the other relocated signal points, whereby the peak power and peak-to-average power ratio required for transmission are reduced.

As described in U.S. Pat. No. 4,675,619, the relocation of signal points in this manner is effected by a code converting unit which may, for example, comprise logic circuitry. As the form of such a code converting unit is known to those of ordinary skill in the art, it need not be described here. Similar forms of code converting unit can be used in carrying out the method of this invention as described further below.

Typically, the digital signals which are represented by the 256 signal points are Gray coded, so that adjacent signal points differ from one another in only one bit position. Representing 4-bit digital signals by their hexadecimal equivalents, each signal point corresponds to a two-digit hexadecimal number, 00 to FF. In each hexadecimal number, for the square array and hence for the signal points which are not relocated, the first hexadecimal digit of the number represents a row of the square and the second hexadecimal digit of the number represents a column of the square. With the signal points relocated as shown in FIG. 1 and as taught in the prior art, the signal points correspond to a generally circular pattern of hexadecimal numbers as shown below. For convenience, the diagram below also illustrates the references 11' to 16'.

```
                           15' 14' 16'
                            |   |   |
                  91 81 83 8B 89 99
               82 86 87 85 84 8C 8D 8F 8E 8A
            93 92 96 97 95 94 9C 9D 9F 9E 9A 9B
         B1 B3 B2 B6 B7 B5 B4 BC BD BF BE BA BB B9
         A0 A1 A3 A2 A6 A7 A5 A4 AC AD AF AE AA AB A9 A8
         E0 E1 E3 E2 E6 E7 E5 E4 EC ED EF EE EA EB E9 E8
      80 F0 F1 F3 F2 F6 F7 F5 F4 FC FD FF FE FA FB F9 F8 88 -  11'
      90 D0 D1 D3 D2 D6 D7 D5 D4 DC DD DF DE DA DB D9 D8 98 -  12'
      B0 C0 C1 C3 C2 C6 C7 C5 C4 CC CD CF CE CA CB C9 C8 B8 -  13'
      30 40 41 43 42 46 47 45 44 4C 4D 4F 4E 4A 4B 49 48 38
      10 50 51 53 52 56 57 55 54 5C 5D 5F 5E 5A 5B 59 58 18
      00 70 71 73 72 76 77 75 74 7C 7D 7F 7E 7A 7B 79 78 08
         60 61 63 62 66 67 65 64 6C 6D 6F 6E 6A 6B 69 68
         20 21 23 22 26 27 25 24 2C 2D 2F 2E 2A 2B 29 28
            31 33 32 36 37 35 34 3C 3D 3F 3E 3A 3B 39
               13 12 16 17 15 14 1C 1D 1F 1E 1A 1B
                  02 06 07 05 04 0C 0D 0F 0E 0A
                     11 01 03 0B 09 19
```

Considering for example only the points 11' to 16' in the first quadrant, corresponding to the numbers 88, 98, B8, 89, 8B, and 99 respectively in the above pattern, it can be seen that these differ from the numbers of immediately adjacent signal points in one or three bit positions. For example, the signal point 11' represents the hexadecimal number 88, and is immediately adjacent a signal point (to its left in FIG. 1 and the pattern above) representing the hexadecimal number F8. These numbers in binary are respectively 10001000 and 11111000, which differ from one another in the second, third, and fourth bit positions. Thus there is a Hamming distance of 3 between these numbers. It can be seen that there will be a triple-bit error if the signal point (88) is decoded when the signal point (F8) is transmitted, or if the signal point (F8) is decoded when the signal point (88) is transmitted.

The following table summarizes similar information for all of the relocated points 11' to 16' in the first quadrant:

| Point | 11' | 12' | 13' | 14' | 15' | 16' |
| --- | --- | --- | --- | --- | --- | --- |
| Hex Number | 88 | 98 | B8 | 89 | 8B | 99 |
| Adjacent Number | F8 | D8 | C8 | 8D | 8C | 8F |
| Hamming Distance | 3 | 1 | 3 | 1 | 3 | 3 |

Thus in the first quadrant of the modified constellation, 8 signal points (4 of the 6 relocated points plus 4 of the consequently adjacent points), and likewise 8 points in each other quadrant, have their Hamming distance increased to 3 as a result of the relocation of the signal points into the circle 10. This increase in Hamming distance is particularly undesirable because a single error in interpreting one of these signal points can result in a triple bit error in the decoded digital signal, and such a triple error can not be corrected by convenient block error codes such as a (511,493) BCH code which can be used to correct single and double errors. Furthermore, the relocation of signal points as described above precludes use of the method described in the copending patent application by J. McNicol et al. already referred to, which is particularly convenient for transmitting stuffing indications.

Figure 2:
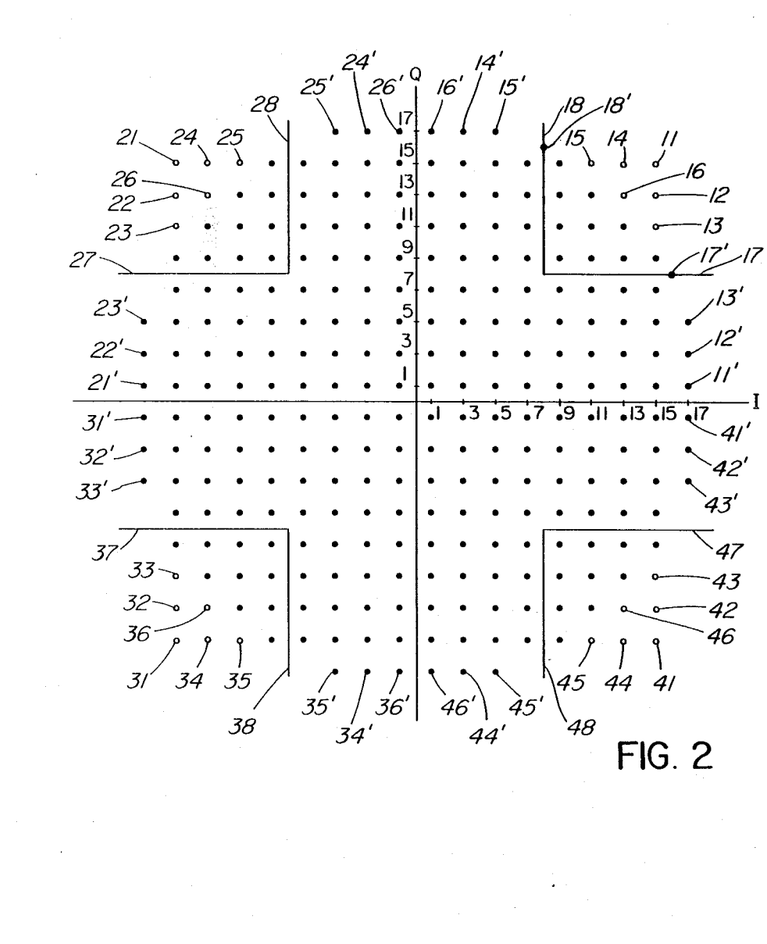
FIGS. 2, 2A, 3, and 4 illustrate 256-QAM signal point constellations arranged in accordance with alternative embodiments of the method of this invention.

Referring now to FIG. 2, in the 256-QAM signal point constellation shown therein the same points 11 to 16, 21 to 26, 31 to 36, and 41 to 46 are relocated as points 11' to 16', 21' to 26', 31' to 36'; and 41' to 46' respectively. The latter points occupy collectively the same positions as the relocated points in FIG. 1, but individually the points are in different positions.

For example, in the first quadrant, the points 11 to 13, which have the same I amplitude of 15 units and differing Q amplitudes, are relocated as the points 11' to 13' respectively, also having the same I amplitude of 17 units and differing Q amplitudes, by being flipped or mirrored about an axis 17 which is parallel to the I axis and equally divides the points in the first quadrant into two halves. In other words, the axis 17 corresponds to a Q amplitude of 8, or substantially half the peak Q amplitude for points in the square matrix.

Similarly, the points 14 and 15 are flipped or mirrored to the points 14' and 15' respectively about an axis 18 corresponding to substanially half the peak I amplitude for points in the square matrix. The point 16 is relocated as to the remaining point 16'.

Similar comments apply for the other quadrants, such that for any quadrant q(q=1, 2, 3, or 4) the points q1 to q3 are flipped about an axis q7 to points q1' to q3' respectively, the points q4 and q5 are flipped about an axis q8 to points q4' and q5' respectively, and the point q6 is relocated as the remaining point q6'.

The following table summarizes information, similar to that given above relating to FIG. 1 relating to the relocated points 11' to 16' in the first quadrant of FIG. 2:

| Point | 11' | 12' | 13' | 14' | 15' | 16' |
| --- | --- | --- | --- | --- | --- | --- |
| Hex Number | 88 | 98 | B8 | 89 | 8B | 99 |
| Adjacent Number | C8 | D8 | F8 | 8D | 8F | 8C |
| Hamming Distance | 1 | 1 | 1 | 1 | 1 | 3 |

Thus with the signal point constellation of FIG. 2 a majority of five of the six points relocated in each quadrant retain the desired Hamming distance of 1, and only the sixth point q6' has a Hamming distance of 3. Thus the signal point constellation of FIG. 2 considerably reduces the possibility of triple bit errors occurring due to errors in interpreting the relocated signal points. The number of signal points which can cause a triple-bit error is only 8 in FIG. 2, compared with 32 in FIG. 1.

Viewed alternatively, in FIG. 2 the points 11, 12, and 13 are rotated through an angle of 180° about a point 17′ to the points 11′, 12′, and 13′ respectively, and the points 14 and 15 are rotated through an angle of 180° about a point 18′ to the points 14′ and 15′ respectively. The point 17′ lies on the axis 17 at an I-component amplitude twice that of the axis 17. Thus a majority (five out of six) of the points relocated in each quadrant are rotated in this manner about the points 17′ and 18′. The point 17′ has I and Q amplitude co-ordinates (16,8) and the point 18′ has I and Q amplitude co-ordinates (8,16).

Figure 2A:
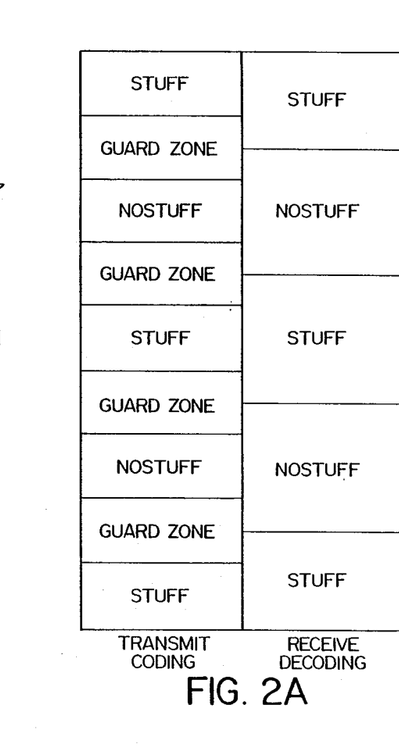

FIG. 2A illustrates how the invention described and claimed in the copending patent application by J. McNicol et al. already referred to can be applied to a signal point constellation formed in accordance with the method of this invention. In that invention as applied to the communication of stuffing indications, a stuff indication bit is transmitted only once in each tdm frame for any particular multiplexed signal in the frame, the stuff and nostuff states of this bit being represented by signal points in the signal point constellation which are separated from one another by a much greater amount than the normal signal point spacing, whereby the error rate applicable to the communication of stuffing indications is greatly reduced. This is achieved by providing two bits (in the same symbol) for the stuffing indication, two of the four possible states of which represent the stuff and nostuff states respectively, and the other two states of which constitute a guard zone between the stuff and nostuff states.

Referring to FIG. 2A, and with the Gray coding as described above, for communicating a stuffing indication the third and fourth bits of the four-bit Q component of the digital signal are used. For transmission, the fourth bit is fixed at 0 and the third bit is used to represent the stuff or nostuff state with the value 0 or 1 respectively. Consequently a stuff state is represented for transmission by any signal point with a hexadecimal number 8X, CX, 4X, or 0X, where X has an arbitrary hexadecimal value. Likewise, a nostuff state is represented for transmission by any signal point with a hexadecimal number AX, EX, 6X, or 2X. For the stuff indication the other states, namely 9X, BX, FX, DX, 5X, 7X, 3X, and 1X, having a fourth Q-component bit of 1, are not transmitted.

At the receiver, the state of the third Q-component bit is used to determine a stuff or nostuff indication with the bit value 0 or 1 respectively. Thus for a stuff indication symbol a received signal point with a hexadecimal number 8X, 9X, DX, CX, 4X, 5X, 1X, or 0X represents a stuff indication and a received signal point with a hexadecimal number BX,, AX, EX, FX, 7X, 6X, 2X, or 3X represents a nostuff indication.

The relocation of signal points as described above with reference to FIG. 2 does not move any signal point representing a stuff indication out of a stuff indication zone, and does not move any signal point representing a nostuff indication out of a nostuff indication zone. For example, in the first quadrant the points 11, 14, and 15 representing a stuff indication are relocated as the points 11′, 14′, and 15′ also representing a stuff indication, the points 12 and 13 are in a guard zone adjacent to stuff and nostuff indication zones respectively and are relocated as the points 12′ and 13′ respectively also in a guard zone adjacent to stuff and nostuff indication zones respectively, and the point 16 is in a guard zone adjacent to a stuff indication zone and is relocated as the point 16′ in a stuff indication zone. As discussed above, the points 12, 13, and 16 would not be used for transmitting stuffing indications as they are in the guard zone.

In contrast, for example in the first quadrant of FIG. 1 the point 11, which would be applying the above scheme be in a stuff indication zone, is relocated as the point 11′ which would be in a nostuff indication zone, thus destroying the increased signal point separation which this scheme uses for increased reliability of communicating stuffing indications.

Although not described further, the same principles of communicating stuffing indications can be applied to signal point constellations arising from other embodiments of this invention, for example those of FIGS. 3 to 6 described below.

Figure 3:
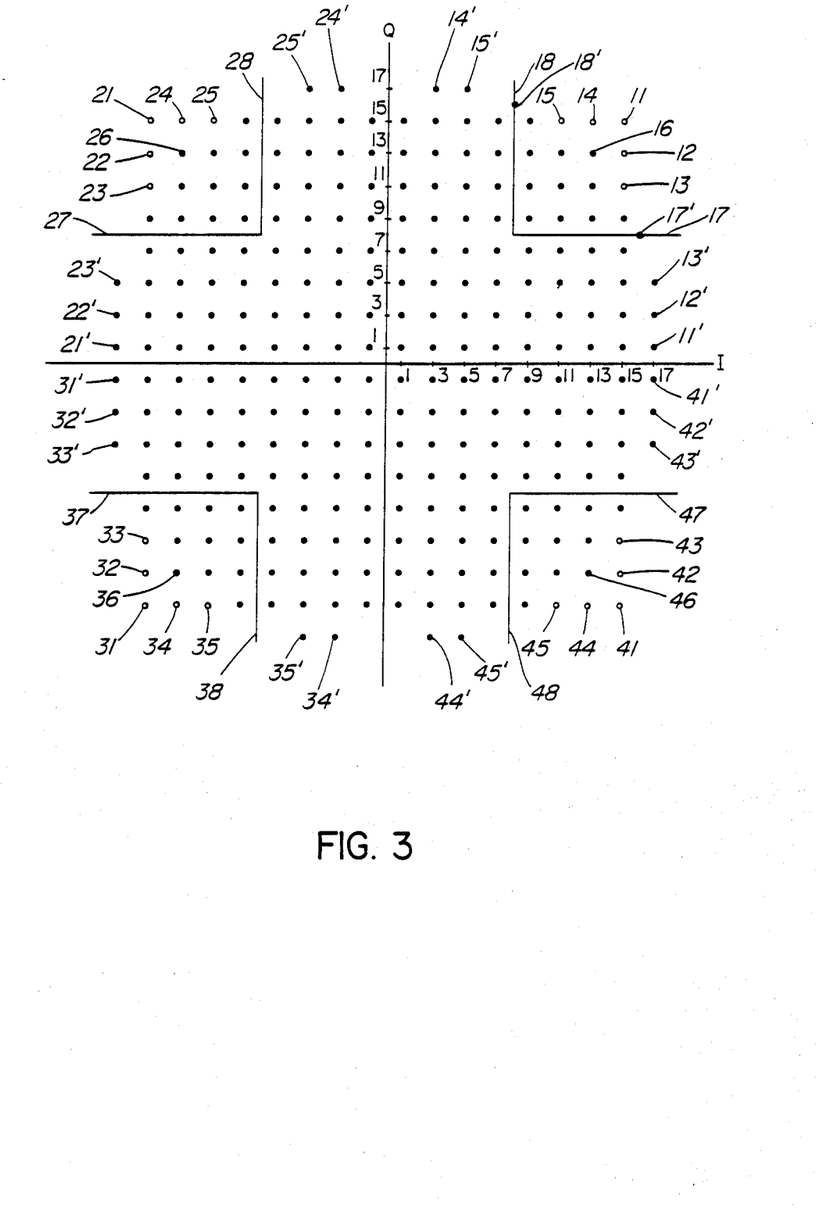

Referring to FIG. 3, the signal point constellation shown therein is identical to that of FIG. 2 except that the signal points 16, 26, 36, and 46 are not relocated, and there are consequently no points 16′, 26′, 36′, and 46′. This provides the same advantages as those discussed above, with the further advantage that now all of the signal points retain a Hamming distance of 1. Thus an error in interpreting any signal point erroneously as an adjacent signal point results in only a single bit error, which as already discussed is correctable using a block code such as a (511,493) BCH code.

This advantage is achieved at the expense of slightly increasing the peak transmitting power required, as the point 16 is at a distance of $(338)^{\frac{1}{2}}$ units from the origin whereas in FIGS. 1 and 2 the furthest points, such as the point 11′ in FIG. 1 or 13′ in FIG. 2, are at a distance of $(314)^{\frac{1}{2}}$ units from the origin as already described. However, the disadvantage of this slight increase in peak power is relatively minor compared with the advantage of all signal points having a Hamming distance of 1, thereby maintaining true Gray coding in the modified signal point constellation.

Figure 4:
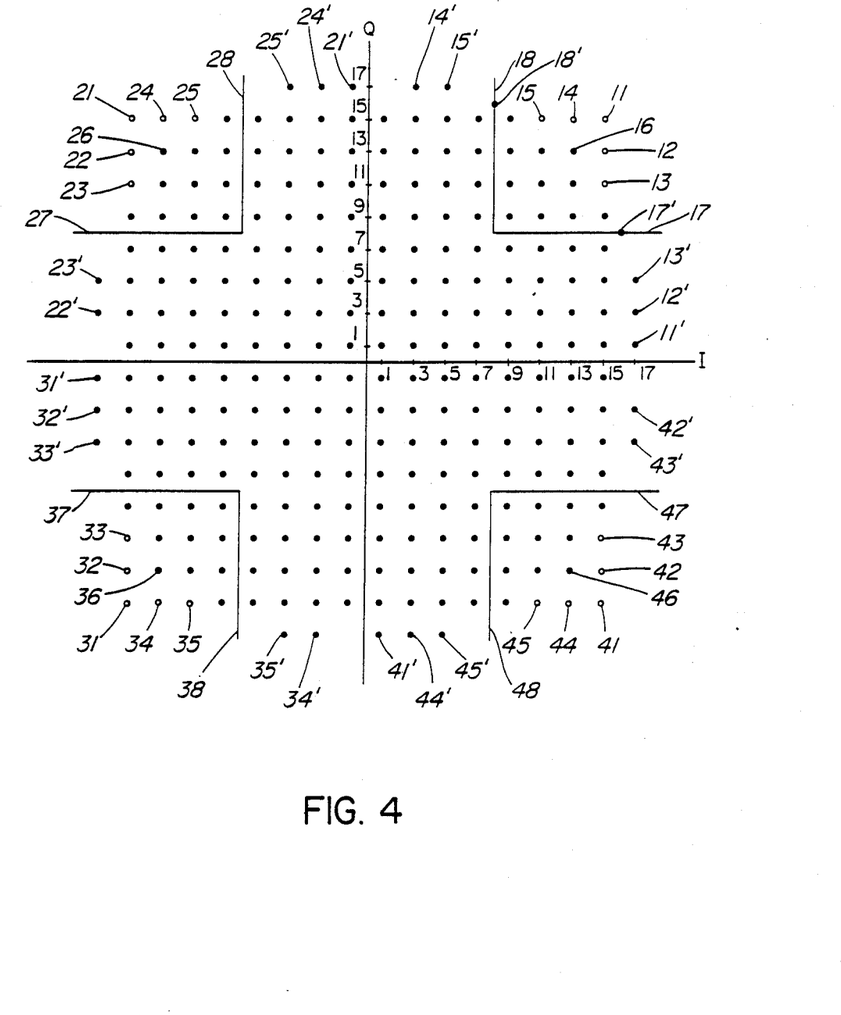

The constellation of FIG. 3 is symmetrical about the I and Q axes, but is not rotationally invariant. In other words, the signal point positions are changed if the I and Q axes are interchanged, corresponding to a phase change of 90°. FIG. 4 illustrates an alternative signal point constellation which, like that of FIG. 2, is rotationally invariant.

In FIG. 4, the signal points in the first and third quadrants are the same as those in the first and third quadrants of FIG. 3. The signal points in the second and fourth quadrants have the same pattern as the first and third quadrants, but rotated through an angle of 90°. Thus in the second quadrant the points 21, 24, and 25 are flipped about the axis 28 parallel to the Q axis to the points 21′, 24′ and 25′ respectively, and the points 22 and 23 are flipped about the axis 27 parallel to the I axis to the points 22′ and 23′ respectively. Similarly, in the fourth quadrant the points 41, 44, and 45 are flipped about the axis 48 to the points 41′, 44′, and 45′ respectively, and the points 42 and 43 are flipped about the axis 47 to the points 42′ and 43′ respectively.

Viewed in the alternative way already described with reference to FIG. 2, in each of FIGS. 3 and 4 all of the points relocated in each quadrant are rotated through an angle of 180° about a respective point such as the points 17′ and 18′ in the first quadrant.

Figure 5:
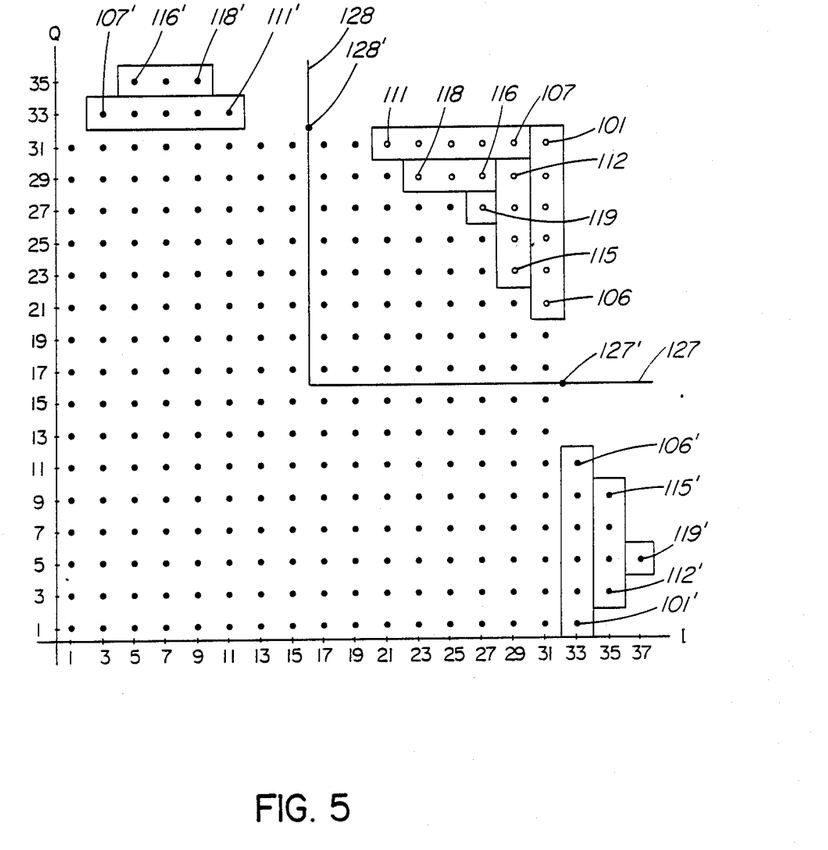
FIGS. 5 and 6 illustrate one quadrant of 1024-QAM signal point constellations arranged in accordance with alternative embodiments of the method of this invention.
Figure 6:
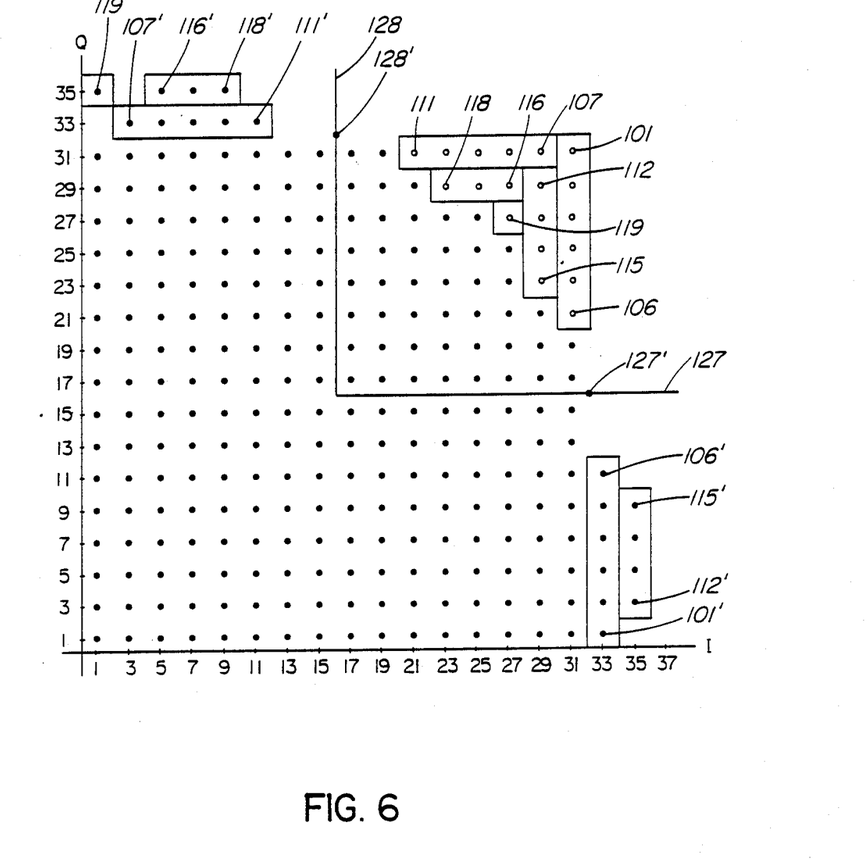

The signal point constellations described above provide 256 points, for 256-QAM. The invention may be similarly applied to other numbers of points in substantially square matrices, i.e. where the number of points is a higher even power of 2. For example, FIGS. 5 and 6 illustrate a first quadrant of alternative signal point constellations for 1024-QAM, having 1024 signal points in a modified square matrix of 32 by 32 signal points. Thus there are 256 signal points in this first quadrant; the other quadrants can be symmetric about the axes as described above with reference to FIG. 3 or rotated by 90° as described above with reference to FIG. 4.

Referring to FIG. 5, nineteen points 101 to 119, only some of which are individually referenced for clarity, are relocated from the corner of the square matrix to lower amplitude points 101' to 119' respectively closer to the I and Q axes. As illustrated, the points 101 to 106 are flipped about an axis 127, parallel to the I axis and at substantially half the square's maximum Q component amplitude, to points 101' to 106' respectively. The points 112 to 115 are similarly flipped about the axis to the points 112' to 115', having relatively the same position with respect to the other relocated points, and with higher I component amplitudes but lower overall amplitudes (distance from the origin). The point 119 is similarly flipped about the axis 127 to the point 119', whereby its distance from the origin is reduced to $(1394)^{\frac{1}{2}}$ units for a signal point spacing of 2 units.

Similarly, the points 107 to 111 are flipped about an axis 128, parallel to the Q axis and at substantially half the square's maximum I component amplitude, to points 107' to 111' respectively, and the points 116 to 118 are flipped about the axis 128 to points 116' to 118' respectively, with higher Q component amplitudes but lower overall amplitudes.

In the signal point constellation of FIG. 5, all of the points still have, using Gray coding, a Hamming distance of 1, so that the same advantage as described above for FIGS. 3 and 4 still apply. The greatest distance from the origin is $(1394)^{\frac{1}{2}}$ units as described above for the point 119', which is much less than the distance of $(1922)^{\frac{1}{2}}$ units for the point 101. The resulting points are not as densely packed within a circular boundary as is taught in the prior art described above, but even such dense packing only reduces the greatest distance from the origin to $(1282)^{\frac{1}{2}}$ units.

FIG. 6 is the same as FIG. 5 except that it shows an alternative position 119' to which the point 119 can be relocated. As a result of this change, the greatest distance from the origin is reduced to $(1354)^{\frac{1}{2}}$ units.

The position of the point 119' in FIG. 6 is such that it has an increased separation of $(8)^{\frac{1}{2}}$ units from the signal point 107' from which it has a Hamming distance of 3. As is known from curves of error probability versus signal-to-noise ratio, for example as shown in FIG. 2 of the copending patent application by J. McNicol et al. already referred to, such an increased separation results in a greatly reduced probability of error. Thus although an error in interpreting the signal point 119' in FIG. 6 erroneously as the point 107' would produce a triple bit error due to the Hamming distance of 3, such an error is particularly unlikely in view of the increased separation between the points 119' and 107'. Furthermore, applying the method described with reference to FIG. 2 for communicating stuffing indications, the point 119 can correspond to a guard zone so that this unlikely error event would not affect the stuffing indications.

Viewed alternatively, in FIG. 5 all of the relocated points 101 to 119, and in FIG. 6 all but one and hence a majority of these points, are rotated through an angle of 180° about a respective point 127' or 128', which points lie on the axes 127 and 128 respectively and have twice the I and Q component amplitudes respectively of the axes 128 and 127 respectively. The points 127' and 128' have I and Q amplitude co-ordinates (32,16) and (16,32) respectively.

The relocated signal point positions shown in FIGS. 5 and 6 are given as examples, and other relocations of the signal points can be made within the scope of the invention. For example, the point 107 could be rotated through 180° about the point 127' instead of about the point 128' as in FIGS. 5 and 6, to the I, Q co-ordinate position (35,1).

Although in the above description reference is made to relocating points by flipping them about an axis or rotating them through 180° about a reference point, it should be appreciated that this is to provide a full understanding and appreciation of the invention and that in carrying out the invention there need be no actual movement of any signal point. In other words, the square arrays of points would not themselves be produced, but rather the points of the signal point constellations of FIGS. 2 to 6 would be produced directly from digital input signals, for example using a PROM (programmable read-only memory). Thus for example for the 256 QAM signal point constellations of FIGS. 2, 3, or 4 a PROM having 256 storage locations each for the I and Q component values of a respective signal point of the constellation could be addressed with an 8-bit digital input signal to read out directly the respective I and Q component values.

Thus although particular embodiments of the invention have been described in detail, it should be appreciated that numerous modifications, variations, and adaptations may be made thereto without departing from the scope of the invention as defined in the claims.

What is claimed is:

1. A method of quadrature-phase amplitude modulation comprising the step of amplitude modulating two carrier signal components I and Q in phase quadrature in accordance with signal points in a signal point constellation, the signal point constellation comprising $2^{2n}$ signal points, where n is an integer equal to or greater than 4, arranged in a modified square array with substantially $2^{2n-2}$ points in each of four quadrants defined by I and Q axes intersecting at an origin of a phase-plane diagram, the signal points in each quadrant of the square array having I and Q component amplitudes of 1, 3, 5, . . . $2^n - 1$ units, the square array being modified by relocating a plurality of points in each quadrant from positions adjacent to a corner of the square to positions extrapolated from the square array and having reduced distances from the origin, wherein in each quadrant each of a majority of the points so relocated is located in a position, relative to the position which it would have in the square array, rotated through an angle of 180° about one of two predetermined points, said two predetermined points having I and Q amplitude co-ordinates of substantially $(2^n, 2^{n-1})$ and $(2^{n-1}, 2^n)$.

2. A method as claimed in claim 1 wherein in each quadrant all of the signal points so relocated are located in positions rotated through an angle of 180° about said predetermined points.

3. A method as claimed in claim 2 wherein n=4.

4. A method as claimed in claim 3 wherein 5 signal points are relocated in each quadrant.

5. A method as claimed in claim 2 wherein n=5.

6. A method as claimed in claim 5 wherein 19 signal points are relocated in each quadrant.

7. A method as claimed in claim 1 wherein in each quadrant all but one of the relocated signal points are located in positions rotated through an angle of 180° about said predetermined points.

8. A method as claimed in claim 7 wherein $n=4$.

9. A method as claimed in claim 8 wherein 6 signal points are relocated in each quadrant, five of them being located in positions rotated through an angle of 180° about said predetermined points.

10. A method as claimed in claim 7 wherein $n=5$.

11. A method as claimed in claim 10 wherein 19 signal points are relocated in each quadrant, 18 of them being located in positions rotated through an angle of 180° about said predetermined points.

12. A method as claimed in claim 11 wherein in each quadrant the nineteenth relocated signal point is located in a position having a separation of at least $(8)^{\frac{1}{2}}$ units from the nearest adjacent signal point in the same quadrant.

13. A method as claimed in claim 1 wherein $n=4$.

14. A method as claimed in claim 13 wherein in each quadrant 5 signal points are relocated to positions rotated through an angle of 180° about said predetermined points.

15. A method as claimed in claim 1 wherein $n=5$.

16. A method as claimed in claim 15 wherein in each quadrant at least 18 signal points are relocated to positions rotated through an angle of 180° about said predetermined points.

17. A method as claimed in claim 1 wherein the signal points in the four quadrants are relocated so that the signal point constellation is symmetric about the I and Q axes.

18. A method as claimed in claim 1 wherein the signal points in the four quadrants are relocated so that the signal point constellation is rotationally invariant for phase changes of 90°.

19. A method of quadrature-phase amplitude modulation comprising the step of amplitude modulating two carrier signal components I and Q in phase quadrature in accordance with signal points in a signal point constellation, the signal point constellation comprising $2^{2n}$ signal points, where n is an integer equal to or greater than 4, arranged in a modified square array with substantially $2^{2n-2}$ points in each of four quadrants defined by I and Q axes intersecting at an origin of a phase-plane diagram, the square array being modified by relocating a plurality of points in each quadrant from positions adjacent to a corner of the square to positions extrapolated from the square array and having reduced distances from the origin, wherein each of a majority of the points so relocated is relocated, about an axis parallel to one of said I and Q axes and substantially bisecting the points in the quadrant, to a position at substantially the same distance from said axis.

* * * * *